US008924963B2

(12) United States Patent
Sheehan et al.

(10) Patent No.: US 8,924,963 B2
(45) Date of Patent: Dec. 30, 2014

(54) IN-PROCESS INTERMEDIARY TO CREATE VIRTUAL PROCESSES

(75) Inventors: John M. Sheehan, Cambridge, MA (US); Rajasekhar P. Sistla, Boston, MA (US); Neil Jacobson, Arlington, MA (US)

(73) Assignee: Microsoft Corporation, Redmond, WA (US)

( * ) Notice: Subject to any disclaimer, the term of this patent is extended or adjusted under 35 U.S.C. 154(b) by 1053 days.

(21) Appl. No.: 12/414,692

(22) Filed: Mar. 31, 2009

(65) Prior Publication Data

US 2010/0251236 A1   Sep. 30, 2010

(51) Int. Cl.
*G06F 9/455* (2006.01)
*G06F 9/46* (2006.01)
*G06F 9/48* (2006.01)

(52) U.S. Cl.
CPC ............... *G06F 9/455* (2013.01); *G06F 9/485* (2013.01)
USPC .......................................................... 718/1

(58) Field of Classification Search
None
See application file for complete search history.

(56) References Cited

U.S. PATENT DOCUMENTS

| 5,802,265 | A | 9/1998 | Bressoud et al. |
| 5,961,582 | A | 10/1999 | Gaines |
| 6,075,938 | A * | 6/2000 | Bugnion et al. ............... 703/27 |
| 7,219,354 | B1 | 5/2007 | Huang et al. |
| 2005/0246453 | A1 | 11/2005 | Erlingsson et al. |
| 2006/0047974 | A1 | 3/2006 | Alpern et al. |
| 2006/0069662 | A1 * | 3/2006 | Laborczfalvi et al. ............ 707/1 |
| 2007/0234295 | A1 | 10/2007 | Dufour et al. |
| 2008/0034071 | A1 | 2/2008 | Wilkinson et al. |
| 2008/0307414 | A1 | 12/2008 | Alpern et al. |
| 2009/0007139 | A1 | 1/2009 | Jacobson et al. |
| 2009/0007162 | A1 | 1/2009 | Sheehan |

FOREIGN PATENT DOCUMENTS

| CN | 1700171 A | 11/2005 |
| EP | 1630670 | 3/2006 |
| EP | 1630670 A2 | 3/2006 |
| WO | W02009002751 | 12/2008 |

OTHER PUBLICATIONS

"International Search Report", Mailed Date: Nov. 9, 2010, Application No. PCT/US2010/028940, Filed Date: Mar. 26, 2010, pp. 8.
Endo, et al., "Massive supercomputing coping with heterogeneity of modern accelerators", Parallel and Distributed Processing, IPDPS, IEEE International Symposium, Apr. 14-18, 2008, pp. 1-10.
"About the Application Virtualization Sequencer", Retrieved at<<http://technet.microsoft.com/en-us/library/cc817132.aspx>>, Dec. 1, 2008, pp. 2.

(Continued)

*Primary Examiner* — Corey S Faherty
(74) *Attorney, Agent, or Firm* — Kate Drakos; Micky Minhas

(57) ABSTRACT

In one embodiment, the tools and techniques can include intercepting with an intermediary module in a running non-virtual process a request from the running non-virtual process to create a requested non-virtual process. In response to the request being intercepted, an appropriate virtual process corresponding to the requested non-virtual process can be identified. In addition, a virtual environment that is configured to host the virtual process can be prepared and the virtual process can be added to the virtual environment. Finally, the request can be fulfilled with the virtual process.

20 Claims, 4 Drawing Sheets

(56) References Cited

OTHER PUBLICATIONS

Alpern, et al."PDS: A Virtual Execution Environment for Software Deployment", Retrieved at <<http://www.usenix.org/events/vee05/full_papers/p175-alpern.pdf >>, VEE'05, Jun. 11-12, 2005, Chicago, Illinois, USA, pp. 175-185.

"LANDesk Application Virtualization", Retrieved at <<http://www.infosec.co.uk/ExhibitorLibrary/61/ds_LDAPV_en-A4_24.pdf>>, 2007, pp. 4.

"VMware ThinApp Agentless Application Virtualization Overview", Retrieved at<<http://www.vmware.com/files/pdf/thinapp_intro_whitepaper.pdf>>, 2008, pp. 8.

"Virtual Application vs Virtual Directory ", Retrieved at<<http://blogs.msdn.com/wenlong/archive/2006/11/22/virtual-application-vs-virtual-directory.aspx>>, Posted Nov. 22, 2006, pp. 4.

"Dynamic Application Virtualization", Retrieved at <<http://www.microsoft.com/systemcenter/appv/dynamic.mspx>>, Accessed Feb. 24, 2009, pp. 2.

"Microsoft Application Virtualization Technical Overview", Retrieved at <<http://www.microsoft.com/systemcenter/appv/techoverview.mspx, Accessed Feb. 24, 2009, pp. 2.

"Infrastructure Planning and Design: Microsoft Application Virtualization 4.5", Sep. 2008, pp. 36.

"Call Stack", Edited on Mar. 25, 2009, Retrieved from <<http://en.wikipedia.org/w/index.php?title=Call_stack&oldid=279620111>>, 6 Pages.

"Communication pursuant to Article 94(3) EPC", Application No. 10762133.6, Dated Jan. 3, 2014, 8 Pages.

First Office Action (PCT Application in the National Phase), People's Republic of China Application/Patent No. 201080016206.3, Date of Dispatch: Aug. 22, 2012, pp. 10 (including at least partial English translation of office action notice, and foreign language document).

European Patent Office, Communication, Application No. 10762133.6-1243/2414937 PCT/US2010028940, Date: Aug. 2, 2012, pp. 9.

DLL Injection, Retrieved from <<http://en.wikipedia.org/w/index.php?title=DLL_injection&oldid=280394443>>, as edited Mar. 29, 2009, pp. 2.

* cited by examiner

IN-PROCESS INTERMEDIARY TO CREATE VIRTUAL PROCESSES

BACKGROUND

Application or process virtualization software can decouple applications, which can each include one or more running processes at runtime, from an underlying operating system. Thus, application virtualization can typically allow applications to be run without the need to visit a particular physical machine where the application or is installed. For example, a virtual application package that includes the application and the application's own set of virtual environment configurations may be provided on-demand over a network or on a removable storage device.

A virtual environment isolates one or more virtual applications or processes in the environment from applications or processes outside the environment (e.g., the underlying operating system and/or one or more other applications or processes running on the operating system outside the virtual environment). A virtual environment also facilitates access by the one or more applications or processes within the virtual environment to resources outside the virtual environment, such as resources managed by the underlying operating system. Thus, application or process virtualization typically includes two aspects: isolation and resource management. Isolation typically includes keeping a namespace within the virtual environment separate from one or more namespaces outside the virtual environment. Resource management typically includes managing resources in a way that allows processes in the virtual environment to run properly despite the isolation, and the resources are typically managed in such a way that processes in the virtual environment are unaware of the virtualization.

Because of the isolation aspect of virtualization, a virtual environment can provide a layer of indirection between the underlying operating system and a virtual process in the virtual environment. Once a virtual process is running in the virtual environment, communications can be translated between the virtual and non-virtual environments, as is done with existing application virtualization software.

It can be difficult for a running non-virtual process to create a new virtual process in a natural way because there is not yet a translation or indirection scheme set up for the new virtual process. Some application virtualization software has dealt with this type of virtual process creation by having a surrogate intercept new process creation application programming interface (API) calls that have been sent from initiating non-virtual processes. If available virtual processes can fulfill the process creation calls, the surrogate can be used to invoke procedures to create the corresponding virtual processes in appropriate virtual environments.

SUMMARY

Whatever the advantages of previous tools and techniques for creating virtual processes, they have neither recognized the virtual process creation tools and techniques described and claimed herein, nor the advantages produced by such tools and techniques.

In one embodiment, the tools and techniques can include intercepting with an intermediary module in a running non-virtual process a request from the running non-virtual process to create a requested non-virtual process. In response to the request being intercepted, an appropriate virtual process corresponding to the requested non-virtual process can be identified. In addition, a virtual environment that is configured to host the virtual process can be prepared, and the virtual process can be added to the virtual environment. Finally, the request can be fulfilled with the virtual process.

In another embodiment of the tools and techniques, a running non-virtual process can be configured to initiate a process creation request to create a requested non-virtual process. An intermediary module in the running non-virtual process can be configured to intercept the process creation request. In addition, a virtualization agent can be configured to receive from the intermediary module a notification of the process creation request, to prepare a virtual environment, and to add to the virtual environment a virtual process corresponding to the requested non-virtual process.

In yet another embodiment of the tools and techniques, a process creation request to create a non-virtual process can be initiated in a running non-virtual process. The process creation request can be intercepted with an in-process intermediary module before the request is passed from the running non-virtual process. It can also be determined whether the process creation request corresponds to an available virtual process. If the process creation request corresponds to the available virtual process, then the virtual process can be added to a virtual environment, and the process creation request can be fulfilled with the virtual process.

This Summary is provided to introduce a selection of concepts in a simplified form. The concepts are further described below in the Detailed Description. This Summary is not intended to identify key features or essential features of the claimed subject matter, nor is it intended to be used to limit the scope of the claimed subject matter. Similarly, the invention is not limited to implementations that address the particular techniques, tools, environments, disadvantages, or advantages discussed in the Background, the Detailed Description, or the attached drawings.

DETAILED DESCRIPTION

Figure 1:
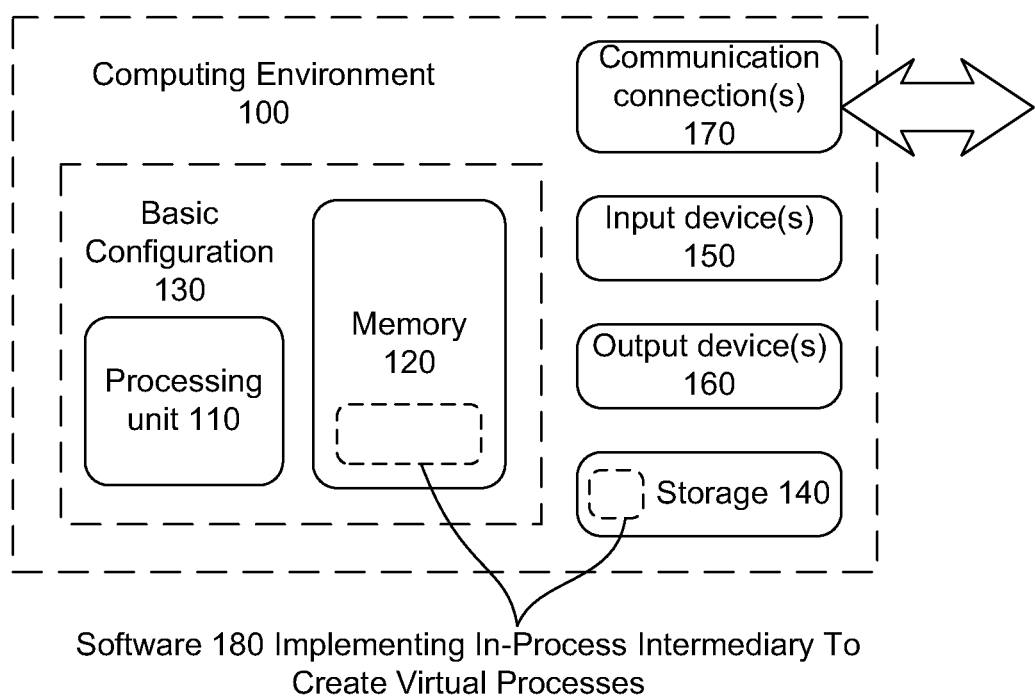
FIG. 1 is a block diagram of a suitable computing environment in which one or more of the described embodiments may be implemented.

Described embodiments are directed to techniques and tools for improved creation of virtual processes from non-virtual process creation requests. Such improvements may result from the use of various techniques and tools separately or in combination.

Such techniques and tools may include intercepting a non-virtual process creation request (i.e., a process creation request for creation of a non-virtual process) while the request is still in the running process that initiated the request. The non-virtual request can be used to identify an appropriate virtual process, and the virtual process can be added to a virtual environment so that the virtual process can fulfill the non-virtual process creation request. The initiating process may initiate process creation requests in various ways and in response to various types of information, such as user input or information received from an operating system or from another process. Because the process creation request can be intercepted in the process where the request was initiated and can be used to add a corresponding virtual process to an appropriate virtual environment before the request leaves the initiating process, the request can be fulfilled with the virtual process without relying on an out-of-process surrogate.

In virtual application scenarios, a virtualization utility is typically aware of multiple namespaces, such as a non-virtual system namespace and one or more virtual environment namespaces. A virtual environment typically defines a namespace view, including namespaces that the virtual environment has access to and policies for doing the composition of names corresponding to the namespaces. A virtual process operating within such a virtual environment typically operates as if there were only a single namespace, and the virtualization software typically translates between that single namespace and other namespaces that may be used by non-virtual software, as well as virtual processes operating in other virtual environments. A virtualization agent (such as the virtualization agent in Microsoft's App-V virtualization software) typically manages the lifetime of virtual environments by preparing or creating and shutting down virtual environments, as needed.

The translation scheme between a virtual process in a virtual environment and processes outside that virtual environment is typically not operational until the virtual environment is created and the virtual process is added to the virtual environment. Thus, in existing techniques a running initiating process that initiated a process creation request is typically unable to create the virtual process without the aid of an out-of-process (i.e., outside the initiating process) surrogate. Such an out-of-process surrogate is typically used to intercept a request to create a requested process after the request leaves the process that initiates the request. Because the request has already left the initiating process, such as in the form of a create process API call, the initiating process and/or the operating system expect the module that receives the API call to be the requested process and to behave as the requested process would behave. Because the surrogate, rather than the requested process, receives the API call, the surrogate typically mimics the behavior of the actual process that was being requested.

Such out-of-process surrogates have several drawbacks. For example, one challenge with such surrogates is trying to maintain the fidelity of what is originally intended to happen. For example, when an application launches, it can be handed information such as command line parameters, an environment block, or other parameters that are supported by an operating system in the computing environment. Thus, a surrogate typically needs to have functionality to handle those parameters. If a new extension point (i.e., a place in an operating system where code can be registered for the code to be triggered, such as a shortcut extension point, a file type association extension point, a com object extension point, a services extension point (such as an NT services extension point), etc.) is used for launching the application, the surrogate may need to be expanded to include functionality to deal with the new extension point and all the different parameters or metadata that the extension point supports. Some virtualization schemes even have a different surrogate for each extension point.

In addition, one process may directly call (and thereby request the creation of) another process without utilizing an operating system extension point. To launch a virtual process corresponding to the called process in that situation, a surrogate for that particular called process may be used. However, creating such a surrogate for every process that may be called in an application can be extremely difficult, especially for complex applications. In addition, sometimes a calling process in such a situation checks one or more attributes of the called process, such as a version number, file size, or a digital signature. Because the calling process expects the surrogate to actually be the called process, the out-of process surrogate would need to mimic such attributes, which could be very difficult to do.

The tools and techniques for virtual process creation from non-virtual requests described herein can overcome one or more of the drawbacks of using out-of-process surrogates. However, it may be possible to use the tools and techniques discussed below along with out-of-process surrogates in some situations.

The subject matter defined in the appended claims is not necessarily limited to the benefits described herein. A particular implementation of the invention may provide all, some, or none of the benefits described herein. Although operations for the various techniques are described herein in a particular, sequential order for the sake of presentation, it should be understood that this manner of description encompasses rearrangements in the order of operations, unless a particular ordering is required. For example, operations described sequentially may in some cases be rearranged or performed concurrently. Techniques described herein with reference to flowcharts may be used with one or more of the systems described herein and/or with one or more other systems. Moreover, for the sake of simplicity, flowcharts may not show the various ways in which particular techniques can be used in conjunction with other techniques.

I. Exemplary Computing Environment

FIG. 1 illustrates a generalized example of a suitable computing environment (100) in which one or more of the described embodiments may be implemented. For example, one or more such computing environments can be used as a system that implements the tools and techniques described below for creating virtual processes from non-virtual requests. Generally, various different general purpose or special purpose computing system configurations can be used. Examples of well-known computing system configurations that may be suitable for use with the tools and techniques described herein include, but are not limited to, server farms and server clusters, personal computers, server computers, hand-held or laptop devices, multiprocessor systems, microprocessor-based systems, programmable consumer electronics, network PCs, minicomputers, mainframe computers, distributed computing environments that include any of the above systems or devices, and the like.

The computing environment (100) is not intended to suggest any limitation as to scope of use or functionality of the invention, as the present invention may be implemented in diverse general-purpose or special-purpose computing environments.

With reference to FIG. 1, the computing environment (100) includes at least one processing unit (110) and memory (120). In FIG. 1, this most basic configuration (130) is included within a dashed line. The processing unit (110) executes computer-executable instructions and may be a real or a virtual processor. In a multi-processing system, multiple processing units execute computer-executable instructions to increase processing power. The memory (120) may be volatile memory (e.g., registers, cache, RAM), non-volatile memory (e.g., ROM, EEPROM, flash memory), or some combination of the two. The memory (120) stores software (180) implementing an in-process intermediary to create virtual applications.

Although the various blocks of FIG. 1 are shown with lines for the sake of clarity, in reality, delineating various components is not so clear and, metaphorically, the lines of FIG. 1 and the other figures discussed below would more accurately be grey and fuzzy. For example, one may consider a presentation component such as a display device to be an I/O component. Also, processors have memory. The inventors hereof recognize that such is the nature of the art and reiterate that the diagram of FIG. 1 is merely illustrative of an exemplary computing device that can be used in connection with one or more embodiments of the present invention. Distinction is not made between such categories as "workstation," "server," "laptop," "handheld device," etc., as all are contemplated within the scope of FIG. 1 and reference to "computer," "computing environment," or "computing device."

A computing environment (100) may have additional features. In FIG. 1, the computing environment (100) includes storage (140), one or more input devices (150), one or more output devices (160), and one or more communication connections (170). An interconnection mechanism (not shown) such as a bus, controller, or network interconnects the components of the computing environment (100). Typically, operating system software (not shown) provides an operating environment for other software executing in the computing environment (100), and coordinates activities of the components of the computing environment (100).

The storage (140) may be removable or non-removable, and may include magnetic disks, magnetic tapes or cassettes, CD-ROMs, CD-RWs, DVDs, or any other medium which can be used to store information and which can be accessed within the computing environment (100). The storage (140) stores instructions for the software (180).

The input device(s) (150) may be a touch input device such as a keyboard, mouse, pen, or trackball; a voice input device; a scanning device; a network adapter; a CD/DVD reader; or another device that provides input to the computing environment (100). The output device(s) (160) may be a display, printer, speaker, CD/DVD-writer, network adapter, or another device that provides output from the computing environment (100).

The communication connection(s) (170) enable communication over a communication medium to another computing entity. Thus, the computing environment (100) may operate in a networked environment using logical connections to one or more remote computing devices, such as a personal computer, a server, a router, a network PC, a peer device or another common network node. The communication medium conveys information such as data or computer-executable instructions or requests in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

The tools and techniques can be described in the general context of computer-readable media. Computer-readable media are any available media that can be accessed within a computing environment. By way of example, and not limitation, with the computing environment (100), computer-readable media include memory (120), storage (140), and combinations of the above.

The tools and techniques can be described in the general context of computer-executable instructions, such as those included in program modules, being executed in a computing environment on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing environment. In a distributed computing environment, program modules may be located in both local and remote computer storage media.

For the sake of presentation, the detailed description uses terms like "determine," "choose," "adjust," "intercept," and "operate" to describe computer operations in a computing environment. These and other similar terms are high-level abstractions for operations performed by a computer, and should not be confused with acts performed by a human being, unless performance of an act by a human being (such as a "user") is explicitly noted. The actual computer operations corresponding to these terms vary depending on the implementation.

Figure 2:
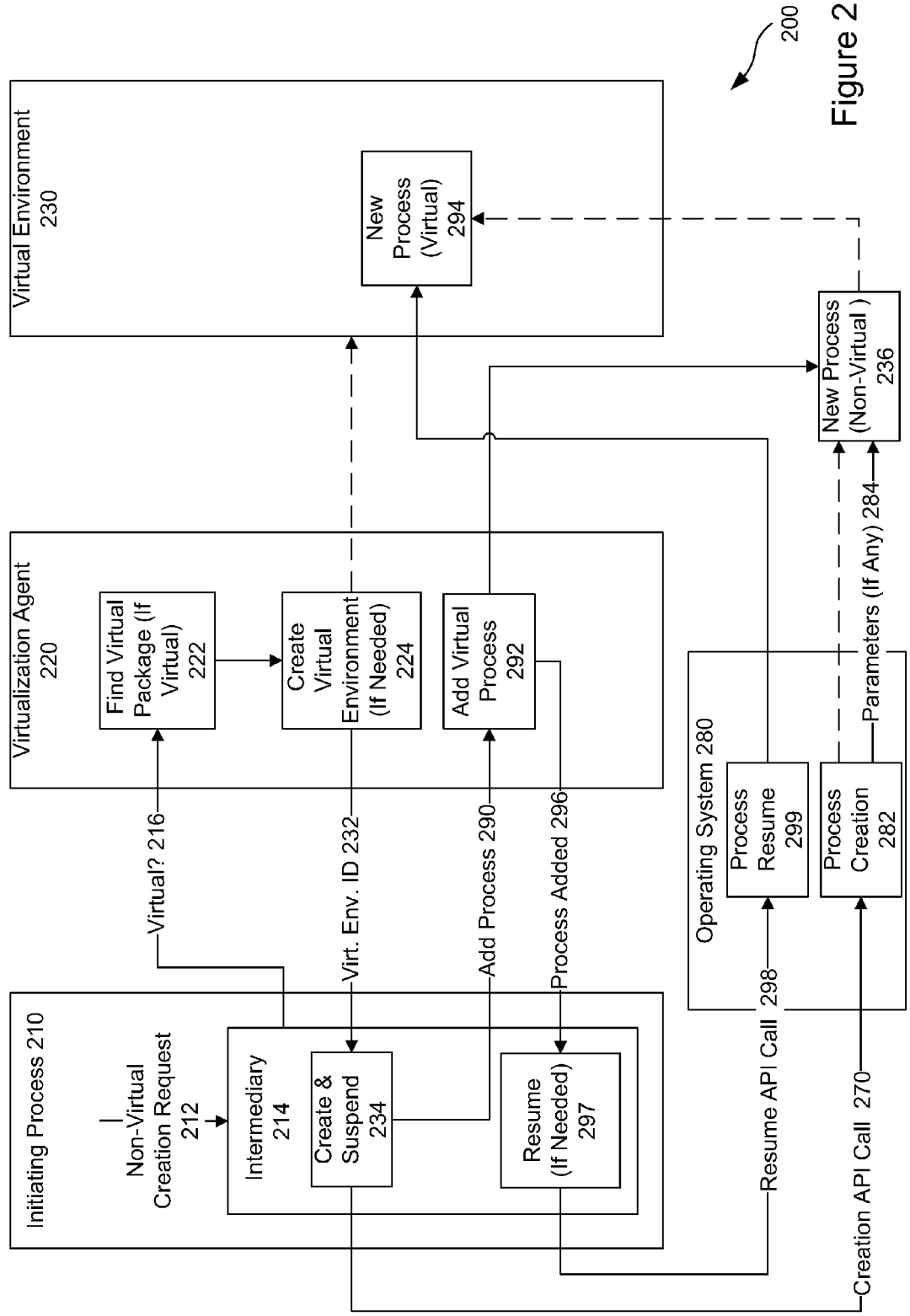
FIG. 2 is block diagram illustrating a computing environment for virtual process creation from non-virtual process creation requests.

II. System and Environment for Virtual Process Creation from Non-Virtual Requests FIG. 2 is a block diagram of a virtual process creation environment (200) in conjunction with which one or more of the described embodiments may be implemented. The virtual process creation environment (200) can include a running non-virtual initiating process (210). The non-virtual initiating process (210) can initiate a non-virtual process creation request (212), which can be a standard request to create a non-virtual process. The request may take different forms within the initiating process, such as handshakes or calls between different components of the initiating process (210).

The process creation request (212) can be intercepted by an in-process intermediary module (214) (a module in the initiating process (210) that intercepts process creation requests to facilitate creation of virtual applications) before the request (212) leaves the initiating process (210). For example, the request (212) can be intercepted before it leaves the initiating process (210) in the form of a process creation API call. This interception may be facilitated by including the in-process intermediary module (214) as a component in a call stack of the initiating process (210), so that calls from the initiating process to other processes can be passed through the in-process intermediary module (214) before they are passed out of the initiating process (210). An in-process intermediary module (214) may be included in multiple different processes running on a particular machine by including code for the in-process intermediary module (214) in general application initiation files, such as the dynamically linked list files specified in the AppInit_DLLs value commonly used in some versions of the Microsoft Windows® operating system.

When the in-process intermediary module (214) intercepts the process creation request (212), the intermediary module (214) can send a virtual process query (216) to a virtualization agent (220) in the same computing environment (200). The virtual process query (216) can include information to identify the process that the process creation request (212) seeks to create. For example, the virtual process query (216) can include a global name such as a path and filename for the process, such as c:\Program Files\Microsoft Office\Office12\WINWORD.exe for Microsoft Word word processing software. Other types of identifying information may be used in addition to or instead of such a global name. For example, in a call for an Internet Authentication Service application, the call may include an identifier, such as a globally unique identifier (GUID) that is not part of the application's path or filename. Whatever the identifying information, it can be used by the virtualization agent (220) to determine whether the requested process corresponds to an available virtual process, and if so, to find (222) a virtual package corresponding to that virtual process. For example, the identifying information can be located in a look-up table that provides information for virtual packages corresponding to particular processes. A virtual package is a package that includes the information for a virtual environment and one or more virtual processes to run in the virtual environment. However, the information for a virtual environment and/or a virtual process may be packaged in some other manner. The virtualization agent (220) can include one or more virtualization modules, such as one for each subsystem that is virtualized (e.g. COM+, Windows Management Instrumentation, etc). For many subsystems, special knowledge about the subsystem process may be used to determine if the subsystem should be virtualized, and in which virtual environment. If the virtualization agent (220) is unable to identify the process as one that should be virtualized, it can give each virtualization module a chance to determine if the process is one that should be virtualized. If a virtualization module determines that the process is one that should be virtualized, that virtualization module can return the appropriate virtual environment identifier to the virtualization agent (220).

If there is no available virtual process that corresponds to the process creation request (212), then the intermediary module (214) can be notified of this, and the creation process (the process of creating the requested process) can be allowed to proceed with creating a non-virtual process. If an available virtual process corresponds to the requested process, then the virtualization agent (220) can determine whether a virtual environment (230) suitable to host the virtual process has already been prepared or created. If not, then the virtualization agent (220) can prepare or create (224) the virtual environment (230) in a standard manner. Whether the virtual environment (230) was already prepared, or whether it is prepared by the virtualization agent (220) in response to the virtual process query (216), the virtualization agent (220) can return a virtual environment identifier (232) to the intermediary module (214) in the initiating process (210).

Upon receiving the virtual environment identifier (232), the intermediary module (214) can create and suspend (234) the requested new process as a non-virtual process (236). Prior to the creation and suspension (234), some preparatory steps for the creation may have already been taken by the initiating process (210) and/or the underlying operating system, although such steps would typically not have resulted in the creation of a requested process. In one implementation, the creation and suspension (234) of the new non-virtual process (236) can proceed in a standard way, such as to produce a process creation API call (270), which can be processed by a process creation module (282) in an operating system (280). Associated parameters (284), if any, can be passed to the new non-virtual process (236). This creation and passing of parameters can be done in the same manner as is currently done with the creation of non-virtual processes. Once created, the new non-virtual process (236) can be suspended.

After the new non-virtual process (236) is created and suspended (234), the intermediary module (214) can pass an add process request (290) to the virtualization agent (220). The add process request (290) can prompt the virtualization agent (220) to add (292) the new non-virtual process (236) to the appropriate virtual environment (230) as a virtual process (294), such as in the same way that applications are currently added to virtual environments with existing application virtualization software. The virtual process (294) can already include the parameters (284) that were passed to it previously when it was a non-virtual process (236), so that it can act on those parameters when it is later resumed.

The code for the virtual environment (230) and the virtual process (294) can be provided as part of a virtual package that defines the settings and configurations for the virtual environment (230) and one or more virtual processes (294) to be run in the virtual environment. Alternatively, the code for the virtual environment (230) and the virtual process (294) may be provided in some other manner.

Adding the virtual process (294) to the virtual environment (230) can result in the computing environment (200) being configured so that calls to the requested non-virtual process are redirected by the virtualization software to the virtual process (294). This can be done with available application virtualization software, such as Microsoft's App-V software. The virtualization agent (220) can pass a notification (296) to the intermediary module (214), notifying the intermediary module (214) that the virtual process (294) was successfully added to the virtual environment (230). In response to the notification (296), the intermediary module (214) can resume (297) the virtual process (294), if such resumption (297) is needed. For example, resumption (297) of the virtual process (294) may not be needed if the initiating process (210) had suspended the new process for some other reason, and the initiating process (210) was not yet ready to resume the new process. In one implementation, the resumption (297) of the virtual process (294) can proceed in a standard way, such as producing a process resume API call (298), which can be processed by a process resume module (299) in the operating system (280) to resume the virtual process (294) in the virtual environment (230).

Because the initiating process (210) can make the creation API call (270) to create the non-virtual process (236) that is added to the virtual environment (230) as the virtual process (294), rather than making a call that creates a surrogate, the drawbacks associated with such surrogates can be avoided. For example, the initiating process (210) can interact with the virtual process (294) as it normally would if the associated non-virtual process were running. The initiating process (210) can make its normal calls to the virtual process (294), verify digital signatures or other information about the virtual process (294), etc. Such calls and verifications can be handled normally by the virtual process (294) because the virtual process (294) is the same process that the initiating process (210) intended to call (although it is running in a virtual environment (230)). Accordingly, a sophisticated surrogate between the initiation process (210) and the virtual process (294) is not needed.

Each of the components (210, 220, 230, 236, 294, 280, etc.) illustrated in FIG. 2 and discussed above can reside in memory, such as the memory (120) discussed above with reference to FIG. 1. In addition, each of the components (210, 220, 230, 236, 294, 280, etc.) illustrated in FIG. 2 can be executed by one or more processing units, such as the processing unit (110) discussed above with reference to FIG. 1, to perform as described above. The techniques discussed below can also be executed with one or more such processing units.

While the particular environment (200) has been described as an example, it should be appreciated that other environments and process creation techniques may also be used. For example, the environment (200) may include multiple virtual environments running on a single operating system, or some other configuration of operating system(s) and virtual environment(s). In addition, the communications and processes within the environment (200) may be ordered or arranged differently than in the description above. As an example of this reordering or rearranging, a virtualization agent may create the virtual environment and add the virtual process to the virtual environment before returning an identifier for the virtual environment to the initiating process.

III. Techniques for Virtual Process Creation from Non-Virtual Requests

The techniques of FIGS. 3 and 4 discussed below can be performed in an environment such as the computing environments (100 and 200) discussed above with reference to FIGS. 1 and 2, or in some other environment.

Figure 3:
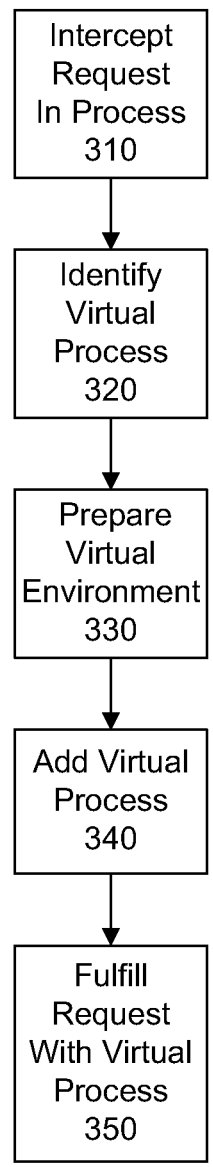
FIG. 3 is a flow diagram illustrating a technique for creating virtual processes from non-virtual process creation requests.

Referring to FIG. 3, a virtual process creation technique will be discussed. A non-virtual process creation request can be intercepted (310) while the request is still in a process that initiated the request. For example, the request can be intercepted by an intermediary module situated in a call stack of the initiating process. A virtual process corresponding to a process requested by the process creation request can be identified (320). For example, this identification (320) can include passing a process identifier to a virtualization agent and having the agent look up the process identifier in a look-up table. Alternatively, the identification (320) can be done in some other way, such as by having an intermediary module in the initiating process look up a process identifier in a look-up table. A virtual environment can be prepared (330). This may be done in response to the process creation request, or the environment may have been prepared previously.

The virtual process can be added (340) to the virtual environment so that the process creation request can be fulfilled (350) by the virtual process, rather than being fulfilled by a requested non-virtual process. This fulfilling (350) can include running the virtual process in the virtual environment according to appropriate parameters so that the virtual process can behave as would be expected from the context of the request in the initiating process. For example, the virtual process may load an associated document or file, or launch in a particular mode.

Figure 4:
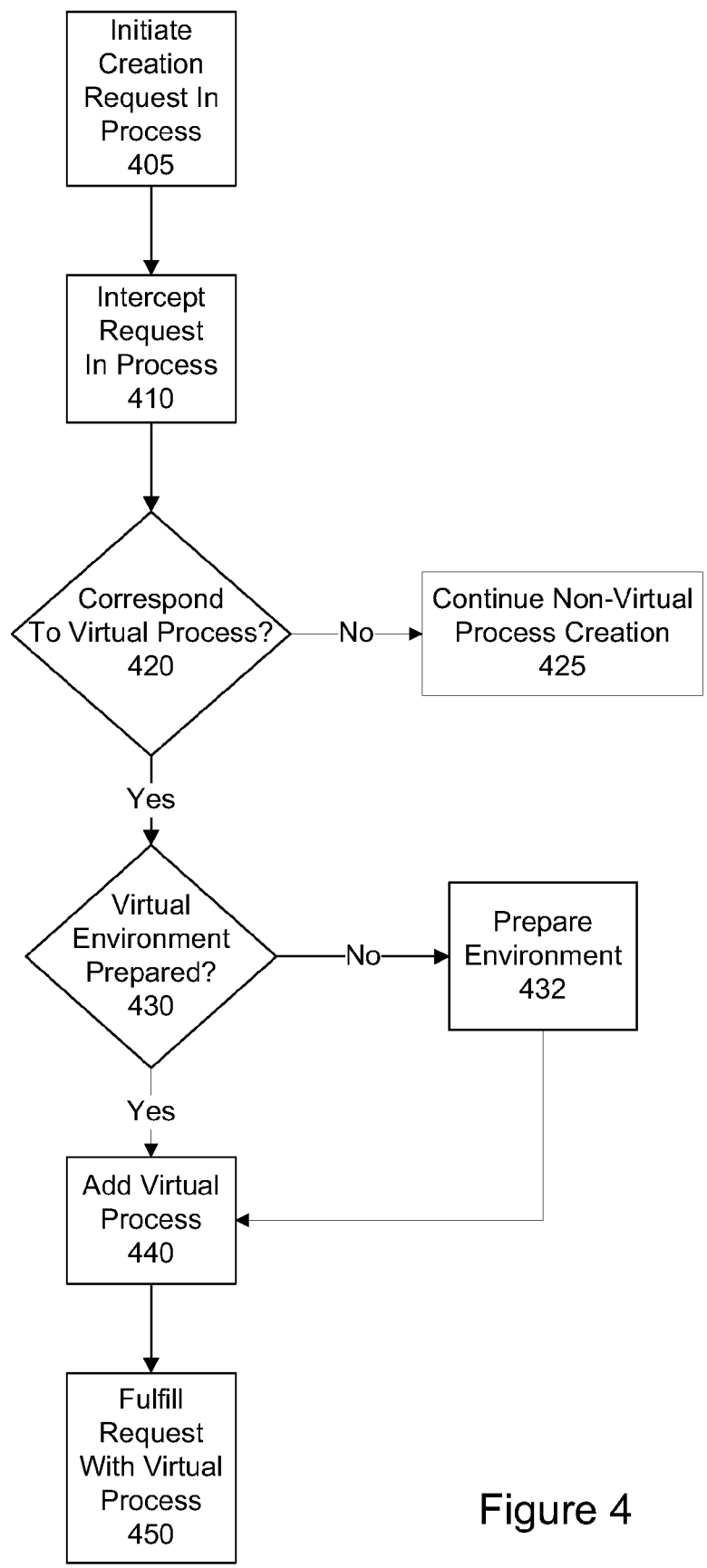
FIG. 4 is a flow diagram illustrating another technique for creating virtual processes from non-virtual process creation requests.

Referring now to FIG. 4, another virtual process creation technique will be discussed. A process creation request for creation of a requested non-virtual process can be initiated (405) in an initiating process. The request can be intercepted (410) while the request is still in the initiating process, and it can be determined (420) whether the requested process corresponds to an available virtual process. If not, or if it is more preferable to launch the non-virtual process than the virtual process, then non-virtual process creation can continue (425). If the requested non-virtual process does correspond to an available virtual process and it is preferable to launch that virtual process, then it can be determined (430) whether an appropriate virtual environment for the virtual process is already prepared. If not, then the virtual environment can be prepared (432). Whether the appropriate virtual environment is prepared before or after the process creation request is intercepted (410), the virtual process that corresponds to the requested process can be added (440) to the virtual environment. In addition, the process creation request can be fulfilled (450) with the virtual process in the virtual environment. For example, the initiating process can send a process creation API call, which can include associated parameters. The parameters can be received by the virtual process, which can result in the virtual process running in a particular way, such as loading a particular file, launching in a particular mode, etc. In some situations, fulfilling (450) may include the virtual process merely running in a default mode.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

We claim:

1. A computer-implemented method, comprising:
   intercepting with an intermediary module in a running non-virtual process a request from the running non-virtual process to create a requested non-virtual process;
   in response to the request being intercepted, identifying an appropriate virtual process corresponding to the requested non-virtual process;
   preparing a virtual environment that is configured to host the virtual process;
   adding the virtual process to the virtual environment; and
   fulfilling the request with the virtual process.

2. The method of claim 1, wherein the intermediary module, the running non-virtual process, and the virtual environment are all on a memory in a computing environment, and the intercepting, identifying, preparing, adding, and fulfilling are all executed by one or more processors in the computing environment, the one or more processors being able to access information stored on the memory.

3. The method of claim 1, wherein identifying an appropriate virtual process comprises querying a virtualization agent to determine whether the requested non-virtual process corresponds to an available virtual process.

4. The method of claim 1, wherein fulfilling the request with the virtual process comprises making an application programming interface call after preparing the virtual environment and after adding the virtual process to the virtual environment.

5. The method of claim 1, wherein identifying the appropriate virtual process comprises using identifying information about the requested non-virtual process.

6. The method of claim 5, wherein the identifying information comprises a global name.

7. The method of claim 6, wherein the name comprises a filename and a path.

8. The method of claim 1, wherein the intermediary module comprises a component in a call stack of the running non-virtual process.

9. The method of claim 1, wherein:
   the virtual environment comprises an environment that isolates one or more virtual processes in the environment from one or more external processes outside the virtual environment, but the virtual environment facilitates access by the one or more virtual processes in the environment to resources managed by an underlying operating system;
   the intermediary module comprises a component in a call stack of the running non-virtual process;
   identifying the appropriate virtual process comprises passing from the intermediary module to a virtualization agent an identifier corresponding to the requested non-virtual process, the virtualization agent being configured to manage one or more virtual environments;
   preparing the virtual environment comprises preparing the virtual environment with the virtualization agent; and
   adding the virtual process comprises adding the virtual process with the virtualization agent in response to intercepting the request.

10. A computer system comprising:
    a memory;
    one or more processing units that are configured to access and process information from the memory;
    a virtualization agent on the memory;

a running non-virtual process on the memory, the running non-virtual process being configured to initiate a process creation request to create a requested non-virtual process;

an intermediary module in the running non-virtual process, the intermediary module being configured to be processed by the one or more processing units to intercept the process creation request;

a virtualization agent on the memory, the virtualization agent being configured to be processed by the one or more processing units to:
- receive from the intermediary module a notification of the process creation request;
- prepare a virtual environment; and
- add to the virtual environment a virtual process corresponding to the requested non-virtual process.

11. The computer system of claim 10, wherein the computer system is configured to fulfill the process creation request with the virtual process.

12. The computer system of claim 10, wherein the running non-virtual process is configured to send an application programming interface call corresponding to the process creation request after the virtual process is added to the virtual environment.

13. One or more computer-readable storage media having computer-executable instructions embodied thereon that, when executed, perform acts comprising:
- initiating in a running non-virtual process in a computing environment a process creation request to create a non-virtual process;
- intercepting the process creation request with an in-process intermediary module before the process creation request is passed from the running non-virtual process;
- determining whether the process creation request corresponds to an available virtual process;
- if the process creation request corresponds to the available virtual process, then:
  - adding the virtual process to a virtual environment; and
  - fulfilling the process creation request with the virtual process.

14. The one or more computer-readable media of claim 13, wherein the intermediary module is a component in a call stack of the running non-virtual process.

15. The one or more computer-readable media of claim 13, wherein fulfilling the process creation request comprises running the virtual process in the virtual environment according to one or more parameters in a process creation application programming interface call from the running process.

16. The one or more computer-readable media of claim 13, wherein determining whether the process creation request corresponds to an available virtual process comprises determining whether an identifier in the process creation request corresponds to an available virtual process.

17. The one or more computer-readable media of claim 16, wherein the identifier comprises a name corresponding to a namespace used by an operating system that supports the running non-virtual process.

18. The one or more computer-readable media of claim 13, wherein adding the virtual process to the virtual environment comprises using a virtualization agent to add the virtual process to the virtual environment.

19. The one or more computer-readable media of claim 13, wherein the acts further comprise:
- determining whether the virtual environment is already prepared; and
- if the virtual environment is not already prepared, then preparing the virtual environment.

20. The one or more computer-readable media of claim 13, wherein fulfilling the process creation request with the virtual process comprises running the virtual process according to one or more parameters.

* * * * *